United States Patent [19]

Bourbeau

[11] 4,238,719

[45] Dec. 9, 1980

[54] ROTATABLE TRANSFORMER FIELD EXCITATION SYSTEM FOR VARIABLE SPEED BRUSHLESS SYNCHRONOUS MOTOR

[76] Inventor: Frank J. Bourbeau, 5411 Toltec Dr., Santa Barbara, Calif. 93111

[21] Appl. No.: 889,902

[22] Filed: Mar. 24, 1978

[51] Int. Cl.$^3$ .............................................. H02P 7/36
[52] U.S. Cl. .................................. 318/716; 318/712; 318/721
[58] Field of Search ............... 318/712, 713, 714, 715, 318/716, 717, 719, 721

[56] References Cited

U.S. PATENT DOCUMENTS

| | | | |
|---|---|---|---|
| 3,210,644 | 10/1965 | Sparrow | 322/25 |
| 3,461,368 | 8/1969 | Haller | 318/716 |
| 3,462,669 | 8/1969 | Picozzi | 318/717 |
| 3,866,099 | 2/1975 | Bourbeau | 318/138 |
| 4,047,095 | 9/1977 | Wijnterp | 322/28 |

FOREIGN PATENT DOCUMENTS

| | | | |
|---|---|---|---|
| 710948 | 6/1965 | Canada | 318/717 |
| 2041783 | 3/1972 | Fed. Rep. of Germany | 318/716 |

*Primary Examiner*—Gene Z. Rubinson
*Assistant Examiner*—Eugene S. Indyk
*Attorney, Agent, or Firm*—Daniel J. Meaney, Jr.

[57] ABSTRACT

A rotatable transformer field excitation system for an armature converter-fed variable speed self-controlled brushless polyphase synchronous motor wherein the armature converter is energized from an alternating current voltage source having one or more phases, and wherein the motor includes a rotor having a wound field winding and a rectifier circuit mounted on the rotor and rotatable therewith to energize the field winding with direct current from the rectifier circuit, and wherein the rotatable transformer includes a primary winding having a number of phases equal to the phases of the alternating current voltage source and having a plurality of coils located in slots on the inner periphery of and defining at least two poles of a rotatable transformer stator, the slots being spaced a predetermined distance from the center of the rotor axis, and a separate rotatable secondary winding, the number of phases of which equals the phases of the rotatable transformer, the secondary winding being formed by a plurality of coils mounted in slots on the outer periphery of the rotor and having the same number of poles as the stator and being electrically connected to the rectifier circuit to produce a direct current to energize the field winding, the rotatable transformer electrical characteristics being selected to have a magnetizing reactance which is greater than the equivalent load resistance presented to the rotatable transformer secondary winding by the rotating rectifier, and an electrical circuit connected between the alternating current source and the armature converter and to the rotatable transformer primary winding to energize the rotatable transformer primary winding with a voltage and current derived from the constant voltage of the alternating current source and from the variable current into the armature converter resulting in a current in the rotatable transformer secondary winding having a magnitude which is substantially independent of variations in motor speed is shown.

20 Claims, 6 Drawing Figures

ROTATABLE TRANSFORMER FIELD EXCITATION SYSTEM FOR VARIABLE SPEED BRUSHLESS SYNCHRONOUS MOTOR

BACKGROUND OF THE INVENTION

1. Field of the Invention

This invention relates to a rotatable transformer field excitation system for an armature converter-fed, variable speed, self-controlled brushless synchronous motor having a wound field winding and a phase wound rotatable transformer-rotating rectifier wherein the primary winding of the rotatable transformer is energized by a voltage and current signal derived from the constant voltage of the alternating current source and from the variable current into the armature converter.

More particularly, the rotatable transformer excitation system utilizes a phase wound rotatable transfromer having a number of phases equal to the phases of the alternating current source, an electrical characteristic having its magnetizing reactance greater than the alternating current load resistance divided by the slip of the rotatable transformer and a current in the secondary winding thereof which is substantially independent of variations of transformer slip over a variable speed range.

2. Disclosure of the Prior Art

The use of a rotatable transformer-rotating rectifier excitation as a brushless method of excitation for an armature fed, variable speed, self-controlled synchronous machine is known in the art. Rotating transformer-rotating rectifier excitation of synchronous motors is described in an article entitled "Rotating-Rectifier Excitation for Synchronous Motors, Synchronous Condensers and Converter-Fed Synchronous Motors" by Gunther Kracke which appeared in the Siemens Review 37 (1970) No. 10, pages 530 to 534, inclusive.

The article in the Siemens Review likewise discloses the use of coaxial rotatable transformer with a rotating secondary winding-rotating rectifier for energizing the field winding. In such an arrangement, the coaxial primary windings of the rotating transformer are stationary, and the coaxial secondary windings rotate with the rotor. The coaxial windings are located in annular slots which are concentric with the axis of the rotor. Special design of the magnetic circuit with longitudinal and transverse stacking of the laminations is used as a means to insure the flux length with both windings encountering the same permeance in every position of the rotary part with respect to the stationary part to avoid short circuiting of the parts. The frequency is the same in both windings because the windings are coaxial. Thus, the same power can be transferred from the primary winding to the secondary winding at all times independently of the speed.

The Siemens article recognizes that, in a variable speed, converter-fed, synchronous motor which is required to operate at zero speed, a conventional exciter consisting of stationary d.c. field poles and a rotating phase wound armature connected to a rotating rectifier cannot be used to excite the field winding because the exciter output is zero at zero speed. Two solutions are suggested to overcome this problem. One solution was to utilize a phase wound rotatable transformer with the stator connected to the alternating current voltage source and the wound rotor connected to the rotating rectifier operated against the rotating field. If the synchronous machine is at zero speed, the rotatable transformer-rotating rectifier provides d.c. field current for the synchronous motor. However, as the motor speed increases, the rotor voltage and field excitation current both increase. In applications such as pump drives when the drive motor operates over a limited speed range of typically 70% to 100% of full speed, this variation in field excitation current may be acceptable. However, in applications such as traction drives, hoist drives, or actuator drives where the motor operates from 0% to 100% of full speed, the change in field excitation with speed caused by the voltage-fed phase wound rotatable transformer is unacceptable.

The second solution suggested in the Siemens article was to use an excitation transformer with a coaxial rotating secondary winding. Use of a coaxial rotatable transformer-rotating rectifier excitation source results in a voltage in the secondary winding of the rotatable transformer which is independent of speed. However, the coaxial rotatable transformer suffers the disadvantage of being expensive and difficult to manufacture.

In U.S. Pat. No. 3,866,099, Bourbeau suggested that the field winding could be fed by a rotatable transformer arrangement in a high frequency-to-low frequency converter system. In such a system having a large difference between the frequency applied to the rotatable transformer and the motor, variations in motor speed do not significantly affect the output of a phase wound rotatable transformer and, of course, have no effect on the output of a coaxial rotatable transformer.

In a variable speed, self-controlled, brushless synchronous motor, or application using the same, where the frequency of the power source is generally comparable to the maximum frequency of the synchronous motor, use of a voltage source to directly energize a phase wound rotatable transformer results in current in the rotatable transformer secondary winding which is dependent on and varies with motor speed.

SUMMARY OF THE INVENTION

The present invention discloses a novel and unique rotatable transformer field excitation system for an armature converter-fed, variable speed self-controlled synchronous motor wherein the armature converter is energized from a single-phase or polyphase alternating current source. The synchronous motor includes a phase wound rotatable transformer-rotating rectifier to produce a direct current to energize the field winding. The rotatable transformer has a number of phases which equal the number of phases of the alternating current voltage source. The primary winding is formed of a plurality of coils located in slots in the inner periphery defining at least two poles of a rotatable transformer stator. The slots are spaced a predetermined distance from the center of the rotor axis. A separate rotatable secondary winding is formed of a plurality of coils mounted in slots on the outer periphery of the rotor. The secondary winding has the same number of poles as the stator. The secondary winding is electrically connected to the rotating rectifier to produce a direct current to energize the field winding. The rotatable transformer electrical characteristics are selected to have a magnetizing reactance which is greater than the alternating current equivalent load resistance divided by the rotatable transformer slip as defined in equation (2) hereinafter.

A current and voltage energizing circuit is connected between the alternating current voltage source and the armature converter and to the primary winding of the rotatable transformer and applies thereto a voltage and current derived from the constant voltage of the alternating current voltage source and from the variable current into the armature converter. The resulting d.c. current in the motor field winding has an acceptably small variation with speed over the motor speed range.

The present invention overcomes several of the problems of the known prior are field excitation systems. The problem of no field excitation at zero speed is overcome by use of a phase wound rotatable transformer in combination with means for deriving excitation currents and voltages and applying the same to the primary winding of the phase wound rotatable transformer.

In the known prior art excitation system for a phase wound rotatable transformer, the current in the secondary winding is dependent on the slip or the speed of the rotatable transformer. This effectively limits both the range of the variable speed of the synchronous motor and the applications in which such field excited synchronous motors can be utilized.

One advantage of the present invention is that the primary winding of the rotatable transformer can be energized by various arrangements of capacitor and stationary transformer connections to provide the self-controlled synchronous motor with the torque-speed characteristics of a series, shunt, or compound wound field d.c. motor, as required for the drive application.

Another advantage of the present invention is that a degree of field weakening or strengthening (decrease or increase in the ratio of motor field to armature current) can be provided to optimize the motor torque-speed characteristics for the application.

Yet another advantage of the present invention is that identical armature converter-fed, variable speed, self-controlled brushless motor characteristics are obtained for forward and reverse rotation.

A still further advantage of the present invention is that the rotatable transformer is the phase wound type which is structurally equivalent to a wound rotor induction motor for which design procedures, tooling, and manufacturing skills are readily available.

BRIEF DESCRIPTION OF THE DRAWING

These and other advantages of the invention, together with its various features and advantages, can be more easily understood from the following more detailed description of the preferred embodiment taken in conjunction with the accompanying drawing in which:

Referring now to FIG. 1, an a.c. voltage source 20 is utilized to energize an armature converter-fed, variable speed self-controlled polyphase synchronous motor, shown by dashed box 22. In such motor, the term "brushless synchronous motor" refers to a synchronous motor wherein the field winding is energized by a rotatable transformer-rotating rectifier circuit. The synchronous motor 22 has a polyphase armature winding or stator winding 24 and a rotor 26 having wound thereon a field winding 28. The field winding 28 is rotatable with the rotor 26. A conventional rotating rectifier circuit 32 electrically is connected to the wound field winding 28. The rotating rectifier 32 is energized by an alternating voltage from a rotatable transformer 38.

Figure 1:
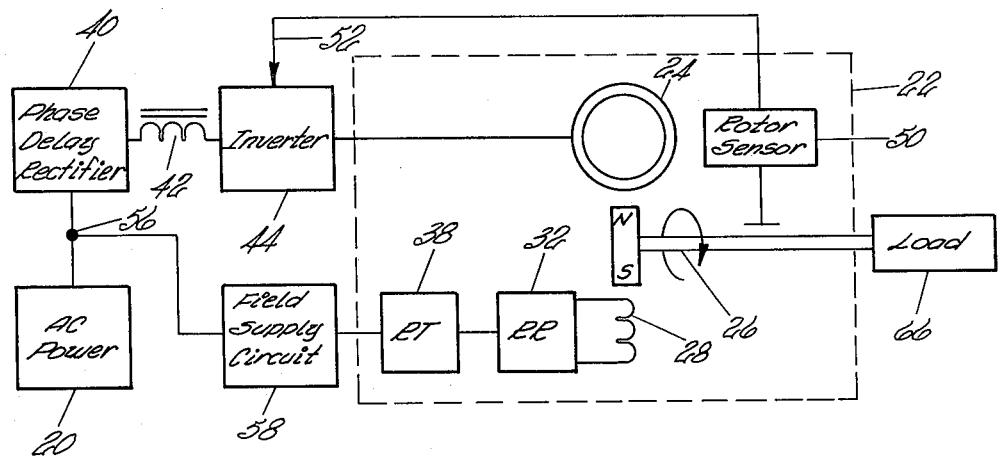
FIG. 1 is one embodiment of a rotatable transformer field excitation system having a field supply circuit for energizing the phase wound rotatable transformer-rotating rectifier, and the polyphase stator windings of the synchronous motor are energized from an alternating current (a.c.) power source through a phase delay rectifier, an inductor and an inverter.

In the embodiment of FIG. 1, the a.c. voltage source 20 is applied to and energizes a phase delay rectifier 40 to produce a direct current output. The output of the phase delay rectifier is applied through an inductor 42 to smooth the rectified current. The direct current voltage from the inductor is then applied to an armature converter 44, which, in this embodiment, is an inverter. The inverter may comprise a plurality of silicon-controlled rectifiers as is well known in the art.

The armature converter 44 is electrically connected between the inductor 42 and the polyphase armature 24. A rotor position sensing means 50 is operatively coupled to the rotor 26 for measuring the angular position of rotor 26 relative to the stationary armature 24 for producing an electrical rotor position signal representative of the angular position of the rotor at any point during rotation thereof, which is applied to the armature converter 44 as is known in the art.

The rotor 26 has the field winding 28 wound thereon and a rectifying means, such as a rotating rectifier 32, both of which are rotatable with rotor 26. The rotating rectifier 32, energizes the field winding 28 with a direct current.

In the embodiment of FIG. 1, a rotatable transformer field excitation system for synchronous motor 22 includes an energizing means electrically connected between the alternating current voltage source 20 and a phase wound rotatable transformer 38. The rotatable transformer 38 has a primary winding having a number of phases equal to that of the a.c. voltage source 20. The rotatable transformer 38 has a secondary winding which is responsive to the current and voltage in the primary winding for producing a current in the secondary winding independent of the slip or speed of the phase wound rotatable transformer 38. The term "phase wound rotatable transformer" as used herein is defined to include a rotatable transformer having a primary winding having a number of phases equal to that of the a.c. voltage source and formed of a plurality of coils located in slots on the inner periphery defining at least two poles of a rotatable transformer stator. The slots are spaced a predetermined distance from the center of the rotor axis. A separate rotatable secondary winding, having a number of phases equal to the phase of the rotatable transformer, is formed of a plurality of coils mounted in slots on the outer periphery of the rotor and having the same number of poles as the stator. The primary winding of the rotatable transformer 38 is electrically connected to the field supply circuit 58 by lead 60. In operation, the rotor 26 is mechanically coupled to a driven load 66 which is to be driven at a variable speed in the range of zero to maximum speed.

Figure 2:
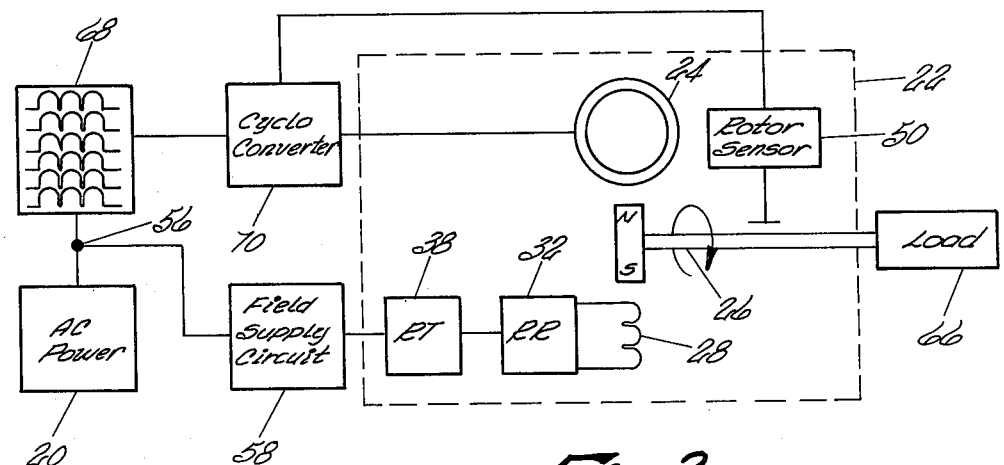
FIG. 2 is another embodiment of a rotatable transformer field excitation system similar to that shown in FIG. 1 with the polyphase stator windings energized from an a.c. power source through an interphase reactor and cycloconverter.

The embodiment of FIG. 2 differs from that of FIG. 1 in that the a.c. power source 20 is electrically connected to an interphase reactor 68 which functions to smooth the current which is applied as an input to a cycloconverter 70. Operation of a cycloconverter is well known in the art and need not be described herein.

In FIGS. 1 and 2, reference is made to the rotatable transformer 38. In particular, the primary winding of the rotatable transformer 38 is electrically connected to the field supply circuit 58 and is adapted to be energized therefrom.

Field supply circuit 58 can be described as a means electrically connected between the a.c. source 20 and the armature converter, for example, rectifier 40 of FIG. 1 or the cycloconverter 70, FIG. 2, and to the rotatable transformer primary winding to energize the rotatable transformer primary winding with a voltage and current derived from the constant voltage of the alternating current source 20 and from the variable current into the armature converter.

Figure 3:
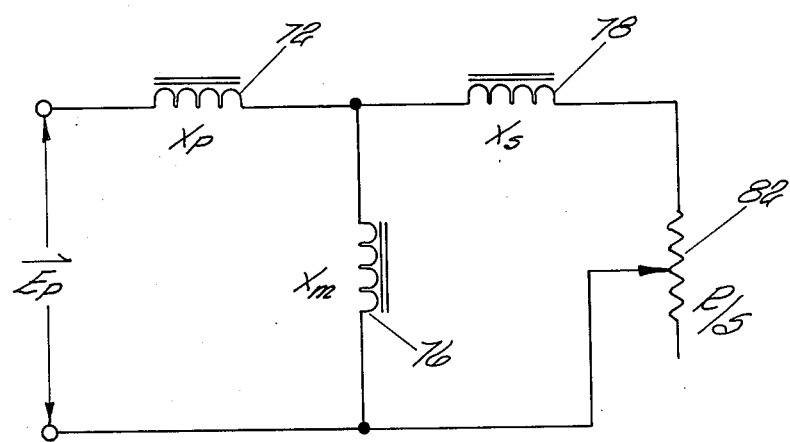
FIG. 3 is a schematic diagram of the equivalent circuit of a rotatable transformer utilized in the rotatable transformer excitation system for FIGS. 1 and 2.

The schematic diagram of FIG. 3 is a single-phase equivalent circuit of a phase wound rotatable transformer which is shown in FIGS. 1 and 2 as element 38. The equivalent circuit illustrated in FIG. 3 has a primary leakage reactance $X_p$ shown by inductor 72; a secondary leakage reactance $X_s$ shown by inductor 78, a magnetizing reactance $X_m$ shown by inductor 76, and an equivalent a.c. load resistance shown as resistance 82. The a.c. load resistance 82 is defined by the following term:

$$\text{a.c. load resistance} = r/s \qquad (1)$$

wherein:
r = equivalent a.c. load resistance presented to the rotatable transformer secondary at zero speed
s = motor slip The motor slip s can be defined by the following equation:

$$s = 1 \pm n/n_s \qquad (2)$$

wherein:
n = rotor shaft speed in rpm; and
$n_s$ = synchronous speed of the rotatable transformer The synchronous speed of the rotatable transformer is determined by the speed of the rotating electromagnetic field, applied to the primary windings which is proportional to the frequency of the a.c. power source and inversely proportional to the number of poles. The term $n_s$ can be reduced to the following formula:

$$n_s = 120 f_{a.c.\ power\ source}/\text{number of poles} \qquad (3)$$

In addition, the slip can also be expressed in terms of the synchronous motor frequency, rotatable transformer frequency, number of motor poles and number of transformer poles in the following equation:

$$s = 1 \pm (f_m/f_t)(p_t/p_m) \qquad (4)$$

wherein:
$f_m$ equal synchronous motor frequency;
$f_t$ equals transformer frequency;
$p_t$ equals the number of transformer poles; and
$p_m$ equals the number of motor poles.

In a three-phase system where transformer leakage reactance is much smaller than the rectifier load resistance, the equivalent circuit resistance can be expressed by the following formula:

$$r = 0.55\ R_{field} \qquad (5)$$

An analysis of FIG. 3 with a current source input shows that as the shaft speed approaches the rotatable transformer synchronous speed, the slip of the rotatable transformer decreases. In such event, the a.c. load resistance becomes larger which has a moderate tendency to increase the current in the primary winding of the rotatable transformer provided that the shaft does not exceed approximately 80% of the rotatable transformer synchronous speed. Conversely, when shaft increases in speed in the opposite direction of the rotatable transformer synchronous speed, the slip increases to a value greater than one, thereby decreasing the a.c. load resistance. In such event, the current in the primary winding has a moderate tendency to reduce due to the decrease in the a.c. load resistance.

The above analysis is based on a magnetizing reactance $X_m$ which is greater than the a.c. load resistance. In practice, quasi-current excitation for the rotatable transformer primary winding to make the rotatable transformer secondary current relatively independent of speed is obtained from a current transformer having primary windings connected in series with the armature converter. This current transformer is one of the means for deriving primary winding excitation for the rotatable transformer from the a.c. voltage source and current which varies as the input current to the armature converter, and is illustrated as the field supply circuit 58 in FIGS. 1 and 2.

Figure 4:
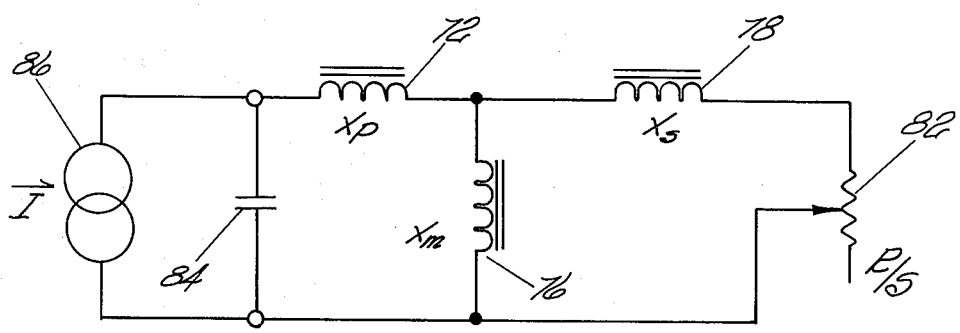
FIG. 4 is a schematic diagram of the equivalent circuit of a shunt tuned current fed rotatable transformer excitation system.

The equivalent circuit of FIG. 4 shows a shunt tuned current fed rotatable transformer field excitation system wherein the means for energizing the primary winding of the rotatable transformer 38 includes a current transforming means 86 having a primary winding which is energized by the current from the a.c. voltage source 20 into the armature converter and a secondary output winding having a current induced thereon from the primary winding of the current transforming means. The secondary output winding is electrically connected to energize the primary winding of the rotatable transformer 38, the primary leakage reactance of which is shown as 72 in FIG. 4.

The rotatable transformer field excitation system further comprises capacitance means 84 electrically connected in parallel with each phase of the rotatable transformer primary winding. The capacitance means is selected to have a reactance equal to the sum of the rotatable transformer magnetizing reactance $X_m$ plus the primary leakage reactance $X_p$. In the preferred embodiment of the rotatable transformer excitation system, the capacitance means is at least one capacitor connected in parallel with each phase of the primary winding of the rotatable transformer 38.

It can be shown mathematically that the value of the reactance of the capacitance means is defined by the following formula:

$$X_c = X_m + X_p \quad (6)$$

Figure 5:
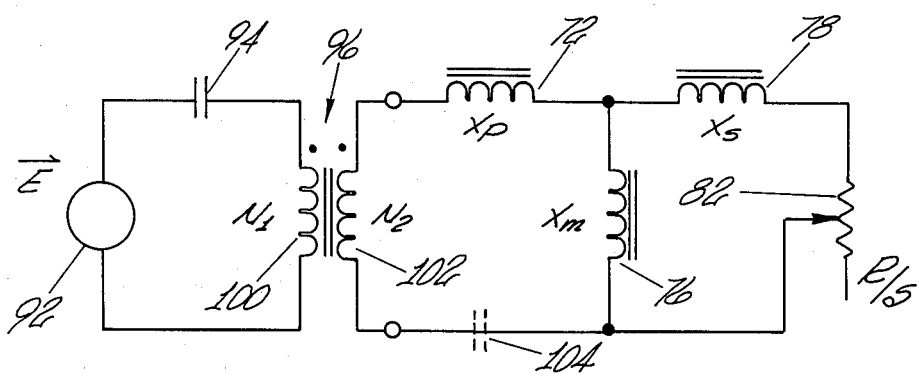
FIG. 5 is a schematic diagram of the equivalent circuit of a series tuned voltage fed rotatable transformer excitation system.

The equivalent circuit of FIG. 5 shows a series tuned voltage fed rotatable transformer excitation system. The means for energizing the primary winding of the rotatable transformer 38 includes means electrically connected between each phase of the alternating current voltage source 20 and each primary winding of the rotatable transformer 38. In the preferred embodiment, the voltage source shown as 92 in FIG. 5 is the constant voltage of the alternating current voltage source 20.

A step down transformer 96 having a primary winding 100 and a secondary winding 102 is used for reducing the magnitude of the voltage of the alternating current voltage source 20 to a predetermined lower voltage. The step down ratio is defined by the number of turns of the primary winding 100 of each phase (defined as $n_1$) divided by the number of turns of the secondary winding 102 of each phase (defined as $n_2$).

The means for energizing the primary winding 100 include a capacitance means electrically connected in series with each phase of the rotatable transformer 38 and each phase of the alternating current voltage source 20. The capacitance means may be connected in series between the secondary winding 102 and the primary winding of the rotatable transformer. This is shown by dashed capacitor 104. The reactance of the capacitance means in such a circuit is equal to the sum of the rotatable transformer magnetizing reactance plus the rotatable transformer primary leakage reactance. In a polyphase system, the capacitance means may be at least one capacitor connected in series with each phase of the primary winding of the rotatable transformer.

Alternatively, the rotatable transformer excitation system of FIG. 5 may have the capacitance means located in series between the alternating current source 20 and the primary winding 100 of step down transformer 96 which is shown by capacitor 94 in FIG. 5. In such case, the reactance of the capacitance means equals the product of the square of the step down ratio $(n_1/n_2)$ times the sum of the rotatable transformer magnetizing reactance, $X_m$, plus the rotatable transformer primary leakage reactance, $X_p$.

Figure 6:
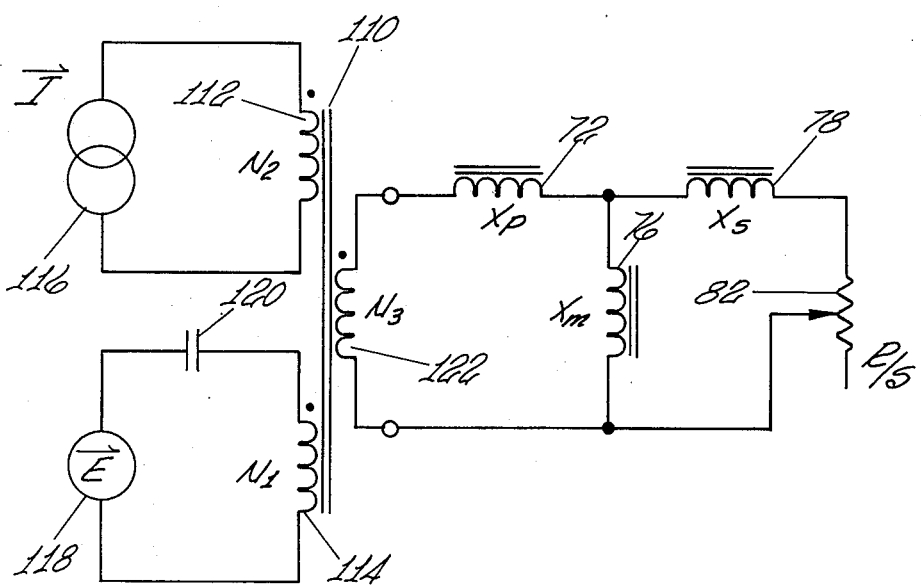
FIG. 6 is a schematic diagram of the equivalent circuit of a current and voltage fed tuned rotatable transformer excitation system.

The equivalent circuit of FIG. 6 shows a current and voltage fed tuned rotatable transformer excitation system. The means for energizing the primary winding of the rotatable transformer 38 includes a compound transformer 110 connected to each phase of the a.c. voltage source 20 and each phase of the primary of the rotatable transformer 38. The compound transformer 110 has two primary windings 112 and 114, and one secondary winding 122. One of the primary windings 112 induces a current in the secondary winding 122 derived from the current to the armature converter from the alternating current voltage source 20. The other of the primary windings 114 applies a stepped down voltage in the secondary winding 122 derived from the voltage of the alternating current voltage source. The step down voltage is determined by the step down ratio of the number of turns of the primary winding of the other primary winding 120 of the compound transformer 38 in each phase ($n_1$) divided by the number of turns of secondary winding 122 in each phase ($n_3$). A capacitance means 120 is electrically connected in series between each phase of the alternating current voltage source shown by voltage source 118 and the other of the primary windings 114. The capacitance means has a reactance equal to the product of the square of the step down turns ratio ($n_1/n_3$) times the sum of the rotatable transformer magnetizing reactance, $X_m$, plus the rotatable transformer primary leakage reactance, $X_p$.

In the preferred embodiment of the rotatable transformer excitation system shown in FIG. 6, the capacitance means is at least one capacitor 120 electrically connected in series with each phase of the voltage source 118 and the other primary winding 114 of the compound transformer.

The rotatable transformer excitation system of the present invention may be used wherein the alternating current voltage source is a polyphase source. In certain applications, the direction of the motor rotation is reversed. In this event, it is necessary to reverse the direction of the electromagnetic field of the rotatable transformer. In the preferred embodiment, this is accomplished by means operatively connected to the primary windings of the rotatable transformer 38 which reverses the phase sequence of the excitation to the rotatable transformer primary windings. In the rotatable transformer excitation system, the reversal of the phase sequence may be obtained by interchanging two of the electrical connections to the rotatable transformer primary windings.

What is claimed is:

1. A rotatable transformer field excitation system for an armature converter-fed variable speed self-controlled brushless polyphase synchronous motor wherein said armature converter is energized from an alternating current voltage source having at least one phase, said motor including a rotor having a wound field winding and a rectifying means mounted on said rotor and rotatable therewith to energize said field winding with direct current from the rectifying means, said rotatable transformer including a rotor which is adapted to rotate around its axis and having an outer periphery and a stator having an inner periphery, said rotatable transformer comprising a primary winding having a number of phases equal to that of the alternating current voltage source and formed of a plurality of coils located in slots on the inner periphery defining at least two poles of the rotatable transformer stator, said slots being spaced a predetermined distance from the center of the rotor axis and a separate rotatable secondary winding having a number of phases equal to the number of phases of the rotatable transformer primary winding and formed of a plurality of coils mounted in slots on the outer periphery of the rotor and having the same number of poles as the stator, said secondary winding being electrically connected to said rectifying means to produce a direct current to energize said field winding, said rotatable transformer having a predetermined magnetizing reactance which is greater than the alternating current load resistance divided by rotatable transformer slip and a predetermined primary leakage reactance; and impedance matching means including reactance tuning means for producing at the primary winding a capacitative reactance equal to the sum of the rotatable transformer magnetizing reactance plus the primary leakage reactance electrically connected between the alternating current source and the rotatable transformer primary winding to energize the rotatable transformer primary winding with a voltage and current derived from constant voltage of the alternating current source and from the variable current into the armature converter, said current in said rotatable transformer secondary winding having a magnitude which is substantially independent of variations in transformer slip over a variable speed range.

2. The rotatable transformer field excitation system of claim 1 wherein the impedance matching means for energizing the primary winding of the rotating transformer includes a current transforming means having a primary winding which is energized by the current from the alternating current source into the armature converter and a secondary output winding having a current induced thereon from the primary winding of the current transforming means; said secondary output winding being electrically connected to energize the primary winding of the rotatable transformer.

3. The rotatable transformer field excitation system of calim 2 wherein said reactance tuning means is a capacitance means electrically connected in parallel with each phase of the rotatable transformer primary winding, said capacitance means having a reactance equal to the sum of the rotatable transformer magnetizing reactance plus the primary leakage reactance.

4. The rotatable transformer excitation system of claim 3 wherein the capacitance means is at least one capacitor connected in parallel with each phase of the primary winding of the rotatable transformer.

5. The rotatable transformer excitation system of claim 1 wherein the means for energizing the primary winding of the rotatable transformer includes voltage reducing transforming means electrically connected between each phase of the alternating current source and each primary winding of the rotatable transformer, said voltage reducing transforming means having a selected turns ratio; and capacitance means electrically connected in series with each phase of the alternating current source and each phase of the voltage reducing means, said capacitance means having a reactance equal to the product of the square of the turns ratio times the sum of the rotatable transformer magnetizing reactance plus the rotatable transformer primary leakage reactance.

6. The rotatable transformer of claim 5 wherein the capacitance means is at least one capacitor connected in series with each phase of the primary winding of the rotatable transformer.

7. The rotatable transformer excitation system of claim 5 wherein said voltage reducing transforming means includes a step down transformer for reducing the magnitude of the voltage of the alternating current source to a predetermined lower voltage wherein the step down turns ratio is defined by the number of turns of the primary winding of each phase divided by the number of turns of the secondary winding of each phase.

8. The rotatable transformer excitation system of claim 7 wherein the capacitance means is located in series between the step down transformer and the primary winding of the rotatable transformer.

9. The rotatable transformer excitation system of claim 7 wherein the capacitance means is located in series between the alternating current source and the step down transformer and the reactance of the capacitance means equals the product of the square of the step down ratio times the sum of the rotatable transformer magnetizing reactance plus the rotatable transformer primary leakage reactance.

10. The rotatable transformer excitation system of claim 1 wherein means for energizing the primary winding of the rotatable transformer includes a compound transformer connected to each phase of the alternating current source and each phase of the primary of the rotatable transformer, said compound transformer having two primary windings and one secondary winding wherein one of the primary windings induces a current in the secondary winding derived from the current input to the armature converter and the other of the primary windings applies a stepped down voltage in the secondary winding derived from the voltage of the alternating current source and wherein the step down voltage is determined by the ratio of the number of turns of the primary winding of said other primary winding of the compound transformer in each phase divided by the number of turns of secondary winding in each phase; and capacitance means electrically connected in series between each phase of the alternating current voltage source and the other of said primary windings, said capacitance means having a reactance equal to the product of the square of the step down turns ratio times the sum of the rotatable transformer magnetizing reactance plus the rotatable transformer primary leakage reactance.

11. The rotatable transformer excitation system of claim 9 wherein said capacitance means is at least one capacitor electrically connected in series with each phase of the alternating current voltage source and said other primary winding of the compound transformer.

12. The rotatable transformer excitation system of claim 1 wherein the alternating current voltage source is a polyphase source and said rotatable transformer includes means operatively connected to the primary windings of the rotatable transformer for reversing the phase sequence of the excitation t the rotatable transformer primary winding when the direction of motor rotation is reversed.

13. The rotatable transformer excitation system of claim 12 wherein the reversal of the phase sequence is obtained by interchanging two of the electrical connections to the rotatable transformer primary winding when the direction of motor rotation is reversed.

14. In combination an alternating current power source having at least one phase a variable speed, self-controlled brushless synchronous motor having a polyphase armature winding and a rotor having a wound field winding and a rotating rectifier for energizing the field winding located thereon and rotatable therewith;

an armature converter electrically connected between the alternating current power source and polyphase armature winding to controllably energize the armature winding in predetermined polyphase sequence;

rotor position sensing means operatively coupled to the rotor and electrically connected to the armature converter for prodcuing and applying to the armature converter an electrical rotor position signal representating the angular position of the rotor relative to the fixed polyphase armature;

a rotatable transformer field excitation system having a rotatable transformer which includes a rotor adapted to rotate about its axis and having an outer periphery and a stator having an inner periphery, said rotatable transformer field excitation system comprising a primary winding having a number of phases equal to that of the alternating current voltage source and formed of a plurality of coils located in slots on the inner periphery defining at least two poles of a rotatable transformer stator, said slots being spaced a predetermined distance from the center of the rotor axis;

a separate rotatable secondary winding having a number of phases equal to the number of phases of the rotatable transformer primary winding and formed of a plurality of coils mounted in slots on the outer periphery of the rotor and having the same number of poles as the rotatable transformer stator, said secondary winding being electrically connected to said rotating rectifier to produce a direct current to energize said field winding, said rotatable transformer having a predetermined magnetizing reactance which is greater than the alternating current load resistance divided by rotatable transformer slip and a predetermined primary leakage reactance; and impedance matching means including reactance tuning means for producing at the primary winding a capacitative reactance equal to the sum of the rotatable transformer magnetizing reactance plus the primary leakage reactance electrically connected between the alternating current power source and the rotatable transformer primary winding with a voltage and current derived from the variable current into the armature converter, said current in said rotatable transformer secondary winding having a magnitude which is substantially independent of variations in transformer slip over a variable speed range.

15. The combination of claim 14 wherein said armature converter is an inverter.

16. The combination of claim 14 wherein said armature converter is a cycloconverter.

17. A method for exciting a wound field winding on a rotor in an armature converter-fed, variable speed, self-controlled brushless polyphase synchronous motor energized from an alternating current power source having at least one phase and predetermined frequency wherein the synchronous motor has a rotating rectifier electrically connected to the field winding and the synchronous motor has a maximum frequency which is about the same frequency as that of the alternating current source comprising the steps of deriving by means of a field supply circuit from the alternating current power source a constant voltage and from the variable current into the armature converter a preselected voltage and variable current, the characteristics of which are dependent upon the reactance characteristics of the field supply circuit; and energizing the rotating rectifier and field winding of the motor with a phase wound rotatable transformer including a primary winding which is energized with the preselected voltage and variable current from the field supply circuit and which has a number of phases equal to the phases of the alternating current power source and at least two poles on a rotatable transformer stator and a separate rotatable secondary winding mounted on and rotatable with the rotor and having a number of phases equal to the primary winding and the same number of poles as said rotatable transformer, said rotatable transformer having a predetermined magnetizing reactance which is greater than the alternating current load resistance divided by rotatable transformer slip and a predetermined primary leakage reactance and impedance matching means including reactance tuning means for producing, at the primary winding, a capacitative reactance equal to the sum of the rotatable transformer magnetizing reactance plus the primary leakage reactance electrically connected between the alternating current power source and the rotatable transformer primary winding to energize the rotatable transformer primary winding with a voltage and current derived from constant voltage of the alternating current source and from the variable current into the armature converter and wherein the current in the secondary winding is substantially independent of variations in transformer slip over a variable speed range and the secondary winding is electrically connected to said rotating rectifier to produce therein a direct current to energize the field winding.

18. The method of claim 17 comprising the steps of connecting a capacitance means in parallel with the primary winding of the rotatable transformer;

energizing the primary winding with a current source and capacitance means as the field supply circuit wherein the magnitude of the current varies with the current into the armature converter to form a shunt tuned current fed rotatable transformer.

19. The method of claim 17 comprising the steps of connecting a capacitance means in series with the primary winding of the rotatable transformer;

energizing the primary winding with voltage source and capacitance means as the field supply circuit to form a series tuned voltage fed rotatable transformer.

20. The method of claim 17 wherein the rotatable transformer has two primary windings comprising the steps of energizing one primary winding from a current source wherein the magnitude of the current varies with the current into the armature converter;

concurrently energizing the other primary winding with a constant voltage source; and connecting a capacitance means in series with the other primary winding and constant voltage source, said two primry rotatable transformers being energized concurrently by the current source and voltage source and capacitance means as the field supply circuit to form a current and voltage fed tuned rotatable transformer.

* * * * *